United States Patent
Meinherz et al.

(10) Patent No.: US 9,217,630 B2
(45) Date of Patent: Dec. 22, 2015

(54) INTEGRATED LASER ALIGNMENT AID USING MULTIPLE LASER SPOTS OUT OF ONE SINGLE LASER

(71) Applicant: Rockwell Automation Technologies, Inc., Mayfield Heights, OH (US)

(72) Inventors: Carl Meinherz, Malans (CH); Richard Casty, Chur (CH)

(73) Assignee: CEDES SAFETY & AUTOMATION AG, Landquart (CH)

( * ) Notice: Subject to any disclaimer, the term of this patent is extended or adjusted under 35 U.S.C. 154(b) by 157 days.

(21) Appl. No.: 13/757,321

(22) Filed: Feb. 1, 2013

(65) Prior Publication Data

US 2013/0201480 A1    Aug. 8, 2013

(30) Foreign Application Priority Data

Feb. 2, 2012  (CH) ................ EP1215/3555

(51) Int. Cl.

| | |
|---|---|
| G01B 11/14 | (2006.01) |
| G01V 8/10 | (2006.01) |
| G01V 8/20 | (2006.01) |
| G02B 27/12 | (2006.01) |
| G02B 27/10 | (2006.01) |
| G01B 11/27 | (2006.01) |
| G08B 13/183 | (2006.01) |
| G01D 5/34 | (2006.01) |
| F16P 3/00 | (2006.01) |
| G02B 19/00 | (2006.01) |
| F16P 3/14 | (2006.01) |

(52) U.S. Cl.
CPC ............... *G01B 11/14* (2013.01); *F16P 3/144* (2013.01); *G01B 11/27* (2013.01); *G01D 5/342* (2013.01); *G01V 8/10* (2013.01); *G01V 8/20* (2013.01); *G02B 19/0052* (2013.01); *G02B 27/106* (2013.01); *G02B 27/1086* (2013.01); *G02B 27/123* (2013.01); *G02B 27/126* (2013.01); *G08B 13/183* (2013.01)

(58) Field of Classification Search
None
See application file for complete search history.

(56) References Cited

U.S. PATENT DOCUMENTS

| | | | |
|---|---|---|---|
| 5,302,942 A | 4/1994 | Blau | |
| 6,124,586 A * | 9/2000 | De Coi | 250/221 |
| 6,750,439 B2 * | 6/2004 | Nakazaki et al. | 250/221 |
| 7,508,512 B1 * | 3/2009 | Rollins et al. | 356/399 |
| 2004/0042010 A1 * | 3/2004 | Wuestefeld | 356/400 |
| 2005/0207724 A1 | 9/2005 | Boeckel et al. | |
| 2010/0127158 A1 | 5/2010 | Scheiber et al. | |
| 2010/0219326 A1 * | 9/2010 | Klein et al. | 250/201.1 |
| 2011/0204211 A1 * | 8/2011 | Klingelhofer | 250/208.2 |

FOREIGN PATENT DOCUMENTS

| | | |
|---|---|---|
| DE | 20304211 U1 * | 6/2003 |
| DE | 102009021645 B3 * | 11/2010 |
| DE | 202011051295 U1 | 12/2011 |

(Continued)

*Primary Examiner* — Gordon J Stock, Jr.
(74) *Attorney, Agent, or Firm* — Boyle Fredrickson, S.C.

(57) ABSTRACT

The present invention relates to light curtains, in particular safety light curtains, for monitoring a protective field. Furthermore, the present invention relates to optical units which are part of such a light curtain. An optical unit for an alignment system of a light curtain monitoring a protective field comprises an optical processing element for generating a defined radiation pattern from the radiation emitted by an alignment radiation source, and at least one optical wave guide for guiding radiation from at least one display radiation source to a surface of the optical element which is visible to an observer.

9 Claims, 13 Drawing Sheets

(56) References Cited

FOREIGN PATENT DOCUMENTS

| EP | 0964273 | A2 | 12/1999 |
| EP | 2511737 | A1 | 10/2012 |
| GB | 2364773 | A | 2/2002 |
| JP | 2010310 | A | 1/1990 |
| WO | 2011114571 | A1 | 9/2011 |

\* cited by examiner

INTEGRATED LASER ALIGNMENT AID USING MULTIPLE LASER SPOTS OUT OF ONE SINGLE LASER

CROSS-REFERENCE TO RELATED APPLICATIONS

This application claims priority to European Application No. EP12153555 filed on Feb. 2, 2012, titled, "Integrated Laser Alignment Aid Using Multiple Laser Spots Out Of One Single Laser," the disclosures of which is expressly incorporated herein.

BACKGROUND OF THE INVENTION

The present invention relates to light curtains, in particular safety light curtains, for monitoring a protective field. Furthermore, the present invention relates to optical units which are part of such a light curtain.

Generally, light curtains detect the movement or intrusion of objects into guarded zones, and more particularly, provide protection for human operators who are working with machines or other industrial equipment.

Light curtains employing infrared or visible light beams are used to provide operator safety in a variety of industrial applications. Light curtains typically are employed for operator protection around machinery, such as punch presses, brakes, molding machines, automatic assembly equipment, coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked from penetration by an opaque object, such as the operator's arm, a control circuit shuts the machine down, prevents the machine from cycling, or otherwise safeguards the area.

Usually, safety light curtains comprise two optical units (called bars, sticks, or strips), which are formed as two different constructional units, one of the optical units having the functionality of an emitter and one of a receiver. This dedicated architecture of an emitter and receiver, however, has several drawbacks, for instance the fact that the fabrication costs are high, because each type of optical unit has to be fabricated differently. Consequently, there exist concepts that use an architecture wherein each optical unit has a transceiver unit carrying a plurality of light emitting elements and light receiving elements and at least one separate detachable plug-in module. The first and second transceiver units are identically built, whereas the first and second plug-in modules differ from each other and thus define the functionality of the respective optical unit. For instance, the plug-in module differentiates an optical unit as the emitter with, for instance, the test input, or as the receiver with, for instance, the output signal switching devices, OSSD.

Such a modular architecture is for instance proposed in the European patent application EP 11162263.5 and allows a very cost-effective fabrication, because the transceiver modules are identically built and, furthermore, can be applied in a very flexible way for a multitude of applications and system configurations.

However, this modular transceiver bar configuration is not compatible with laser alignment techniques that employ one laser module as a radiation emitter at each stick, but at different locations for the dedicated receiver and transmitter bar, respectively, as this is for instance shown in the published European patent EP 0889332 B1.

In order to provide an alignment system for systems based on transceiver bars according to the European patent application EP 11162263.5, one possible solution could therefore be seen in providing two laser modules for each transceiver bar. This concept, however, increases the costs due to the additional laser emitter for each transceiver bar.

The object underlying the present invention is to provide a light curtain and an optical unit for a light curtain, which can be fabricated in a particularly cost-effective way, and allow for an accurate alignment and synchronization.

This object is solved by the subject matter of the independent claims. Advantageous embodiments of the present invention are the subject matter of the dependent claims.

SUMMARY OF THE INVENTION

The present invention is based on the idea that one laser module in each stick can be employed when using an optical processing element that generates a defined radiation pattern, for instance a row of multiple spots along the axis of the sticks and a target where the spots generated by the opposing laser module are clearly visible or detectable. With such a configuration, both sticks are still identical and no supplementary laser modules are necessary for providing an accurate alignment.

In particular, an alignment system for a light curtain monitoring a protective field comprises at least one alignment radiation source being arranged on a first support element of the light curtain and at least one alignment radiation receiver arranged on the second support element. This alignment radiation receiver provides an alignment signal indicating a correct positioning of the two support elements with respect to each other.

According to the present invention, the alignment system has at least one optical unit which has an optical processing element for generating a defined pattern from the radiation emitted by the alignment radiation source. This defined pattern can be detected by the alignment radiation receiver and the alignment signal can be generated based on the incident radiation.

The radiation receiver may be just a target surface where the radiation pattern emitted by the opposing laser module is clearly visible and can be evaluated by an operator adjusting the position of the light curtain system. However, also more sophisticated sensor systems can be used for evaluating the position of the opposing stick. According to the present invention, the optical processing element is structured to form in a planar observation region, a plurality of light points arranged in an essentially straight line from the radiation of the laser radiation source. By splitting one laser spot into various spots an alignment accuracy can be reached which normally is only achieved by using more than one laser radiation sources.

A particularly cost effective and on the other hand precisely aligned mounting of the optical unit according to the present invention can be achieved by combining the optical processing element which generates the defined radiation pattern, with at least one additional functional element, such as a lens for focussing the light curtain radiation, and/or an optical waveguide that is needed for guiding the radiation from at least one display radiation source to a surface which is visible to an observer. Such a combined optical unit has a size sufficiently large for a facilitated assembly and may even have additional alignment features for being mounted within the housing of a support element, but on the other hand only needs a relatively small part forming the optical processing element. The optical unit may for instance be fabricated as a molded part from a plastic material or as a micromachined part made from glass, quartz, or plastic. The actual optical processing element may be fabricated from the same material or from a different material as the optical unit.

In case that the optical unit also incorporates a lens arrangement, in an advantageous way two low tolerance fabrication processes can efficiently be combined because the lenses also have to be fabricated and mounted with particularly high accuracy.

Because the optical processing element is incorporated into the optical unit in the frame of a high-precision fabrication step as it is well-established in micro machining technology, its position with regard to the optical waveguides or any other alignment features can be performed accurately and with small tolerances. The position of the optical unit with regard to the support element of the light curtain, on the other hand, is facilitated because the optical unit is large enough to be mounted in a particularly easy way.

According to the present invention, the optical processing element comprises a micro-structured Diffractive Optical Element (DOE), an optical grating structure and/or a prismatic structure for generating a defined pattern from the radiation emitted by the alignment radiation source.

DOEs utilize surfaces with a complex micro structure for a particular optical function. A micro-structured surface relief profile has two or more surface levels. The surface structures are for instance etched in fused silica or other glass types, or are embossed in various polymer materials. As this is generally known, Diffractive Optical Elements work by breaking up incoming waves of light into a large number of waves which re-combine to form completely new waves. They can be fabricated in a wide range of materials, such as aluminium, silicon, silica, plastics etc., providing the user with high flexibility and selecting the material for a particular application.

According to the present invention, a micro-structured DOE is used for generating a defined pattern of light from one single radiation source.

According to an advantageous embodiment, a plurality of light points is generated which are arranged in an essentially straight line. The straight line of light points can be used for evaluating whether the light curtain support elements are correctly aligned with respect to each other.

However, also any other shape of radiation pattern may be used for performing the alignment. For instance, also concentric circles or parallel lines may be generated from one radiation source.

According to the present invention, the light points have different intensity, the central point having a higher intensity compared to the remaining points for facilitating horizontal and vertical alignment of the support elements. However, uniform intensity can also be chosen.

Although DOEs have several significant advantages over conventional refractive optical elements, gratings or prismatic structures may of course also be used in the optical unit according to the present invention.

According to the present invention, a light curtain for monitoring a protective field comprises a first support element and a second support element, wherein the protective field is covered by radiation transmitted between these support elements and an alignment system according to the present invention. By designing each support element essentially identical and distinguishing between the function of the support elements only via different plug-in elements as this is known from EP 11162263.5, a particularly cost-effective fabrication of the light curtain can be achieved. For performing the alignment, an operator may either evaluate the alignment radiation pattern on a particular surface of the opposing support element, or optoelectronic detectors may be provided for measuring the incident radiation pattern and for generating an electrically processible output signal.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DETAILED DESCRIPTION OF THE PREFERRED EMBODIMENT

Figure 1:
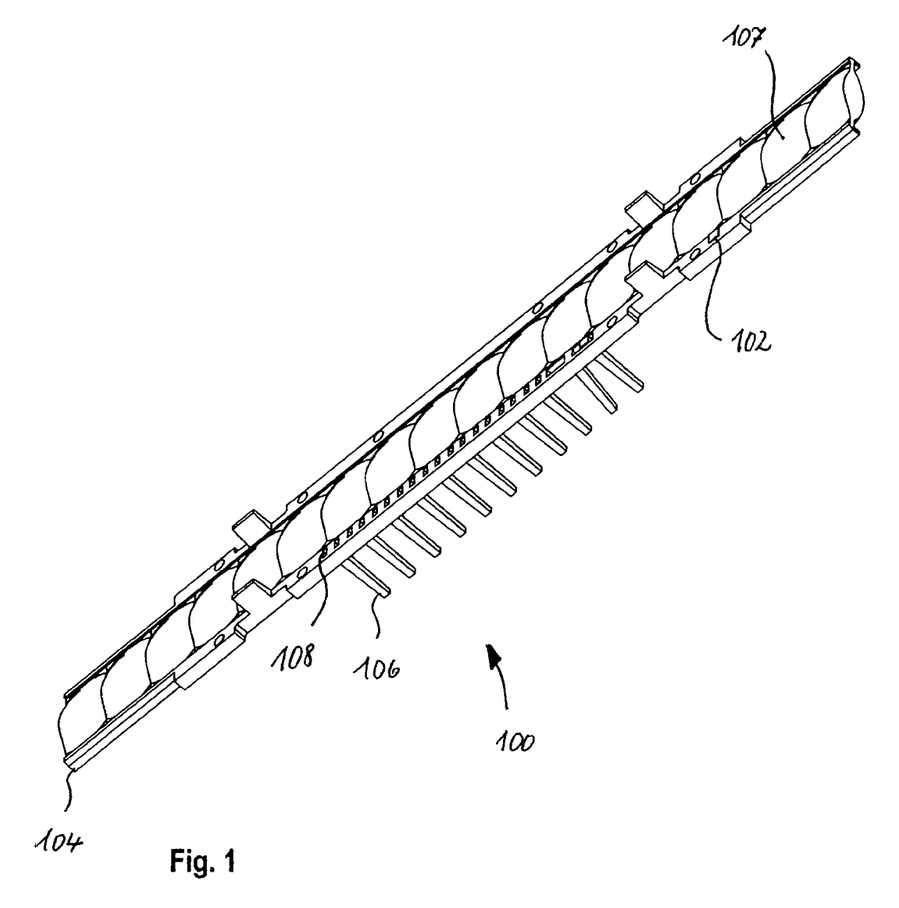
FIG. 1 shows a perspective view of an optical unit according to a first advantageous embodiment.
Figure 2:
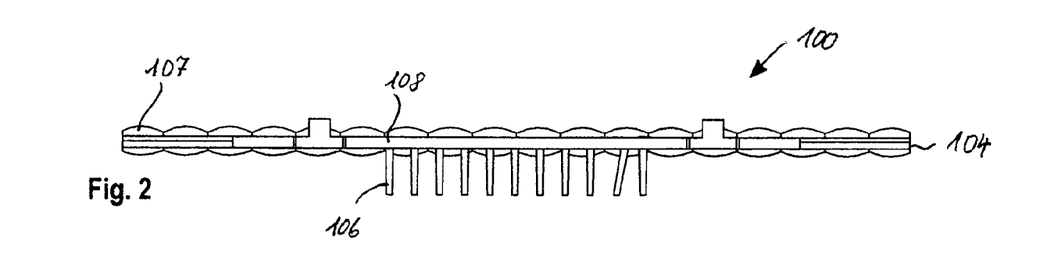
FIG. 2 shows a side view of the optical unit of FIG. 1.
Figures 3, 4:
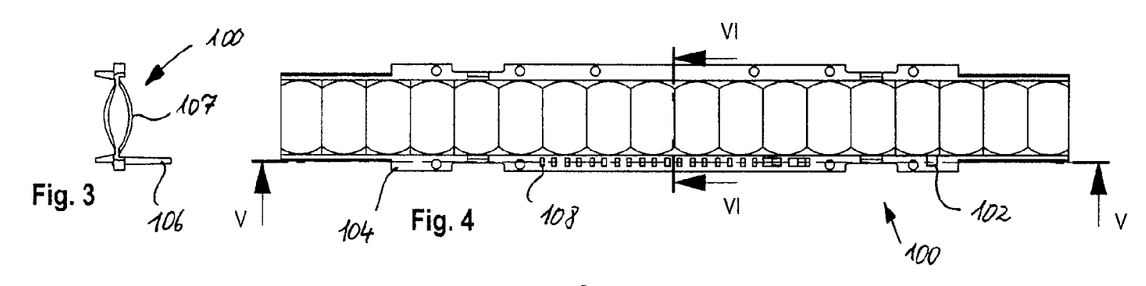
FIG. 3 shows another side view of the optical unit of FIG. 1.
FIG. 4 shows a top view of the optical unit according to FIG. 1.
Figure 5:
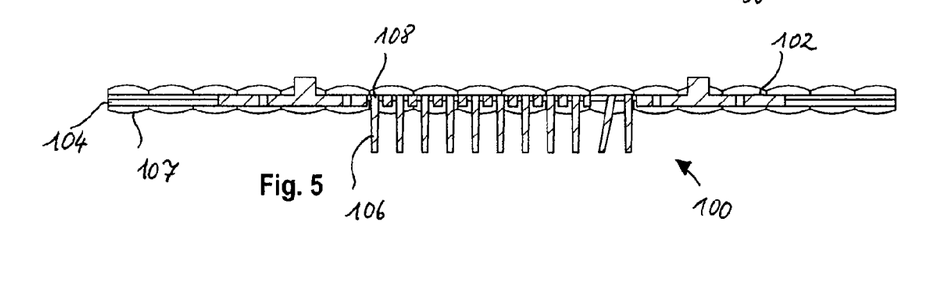
FIG. 5 shows a sectional view of the optical unit according to FIG: 1.
Figure 6:
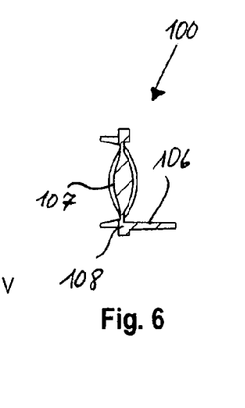
FIG. 6 shows another sectional view of the optical unit according to FIG. 1.

Referring now to FIG. 1, an optical unit according to the present invention is explained in more detail.

The optical unit 100 is designed to be mounted within a support element of a light curtain monitoring a protective field. The optical unit 100 is combining several optical functions as one integral part: Firstly, it accommodates an optical processing element 102 for generating a defined radiation pattern from the radiation which is emitted by an alignment radiation source (not shown in the figure). The optical processing element 102 may for instance comprise a micro-structured Diffractive Optical Element (DOE) which transforms the radiation emitted by a radiation source, such as a laser diode, into a pattern that can be used advantageously for aligning a support element to which the optical unit 100 is connected with respect to a second support element of a light curtain arranged in some distance thereto.

For a person skilled in the art, it is however clear that the optical unit 100 according to the present invention may advantageously be used also for other alignment tasks which utilize optical radiation for the actual alignment.

The optical processing element 102 may form a row of light dots, an array of light dots, a plurality of lines, concentric circles or square structures or any other suitable form from the incident laser beam which can be used for an alignment. In the following, only the example of forming a plurality of light points which are aligned in a straight line, will be explained in more detail, because such a linear pattern is an advantageous means for detecting a misalignment of two light curtain support elements with respect to each other.

According to the present invention, the optical processing element 102 is embedded integrally within the main body 104 of the optical unit 100. Such a construction can either be achieved by forming the optical processing element 102 directly from the same material as the main body 104 or by separately manufacturing the optical processing element 102 and—for instance—overmolding same when fabricating the main body 104.

According to the present invention, the optical unit 100 is produced from a plastic material, or from glass or quartz, either as a molded part or as a micro-machined part.

According to the present invention, as additional optical functional elements, one or more optical waveguides 106 are integrally formed with the main body 104. The optical waveguides 106 guide radiation from at least one display radiation source (not shown in the figures) to a surface 108 of the optical element which is visible for an observer. Such a compact construction of the optical unit 100 allows for a much more precise alignment of the optical processing element 102 with respect to a support element of a light curtain, because of the larger size and the oblong form. The position of the optically active structures of the optical processing element 102 with respect to the main body 104 of the optical unit can be adjusted during a high-precision fabrication step when producing the optical unit 100, whereas the alignment of the optical unit 100 in a support element is done by a mechanical fit, as this will be explained later with respect to FIG. 18.

Furthermore, the optical unit 100 additionally comprises an array of lenses 107 which will be mounted in a way that they focus incident light curtain radiation onto a receiver element and/or form an emitted radiation beam from an emitter element. In the present case, for instance a row of 18 lenses is integrally formed with the optical processing element 102 and the optical waveguides 106. For a person skilled in the art it is of course clear that also only a lens array (even differently shaped) without the waveguides 106, or any other required optical functional elements may be combined with the optical processing element 102 in order to enhance the mounting precision of the optical processing element 102.

FIGS. 2 to 6 show several sectional and side views of the optical unit 100 according to FIG. 1. Depending on the material from which the optical processing element 102 is made, same can be fabricated directly from the material from the main body 104 or can be incorporated for instance by overmolding a pre-fabricated optical chip. As already mentioned above, the optical processing element 102 may comprise a micro-structured DOE. However, also a simpler optical grating structure or a prismatic refractive structure may be chosen for forming the desired radiation pattern from the radiation emitted by an alignment radiation source, such as a laser.

The optical waveguides 106 guide the light from corresponding light sources, such as light-emitting diodes (LEDs) to the outer surface 108 where the light is visible for an observer. Here, a slightly tapered form of the optical waveguides 106 was chosen in order to generate a sufficiently large light point on the display surface 108.

Figure 7:
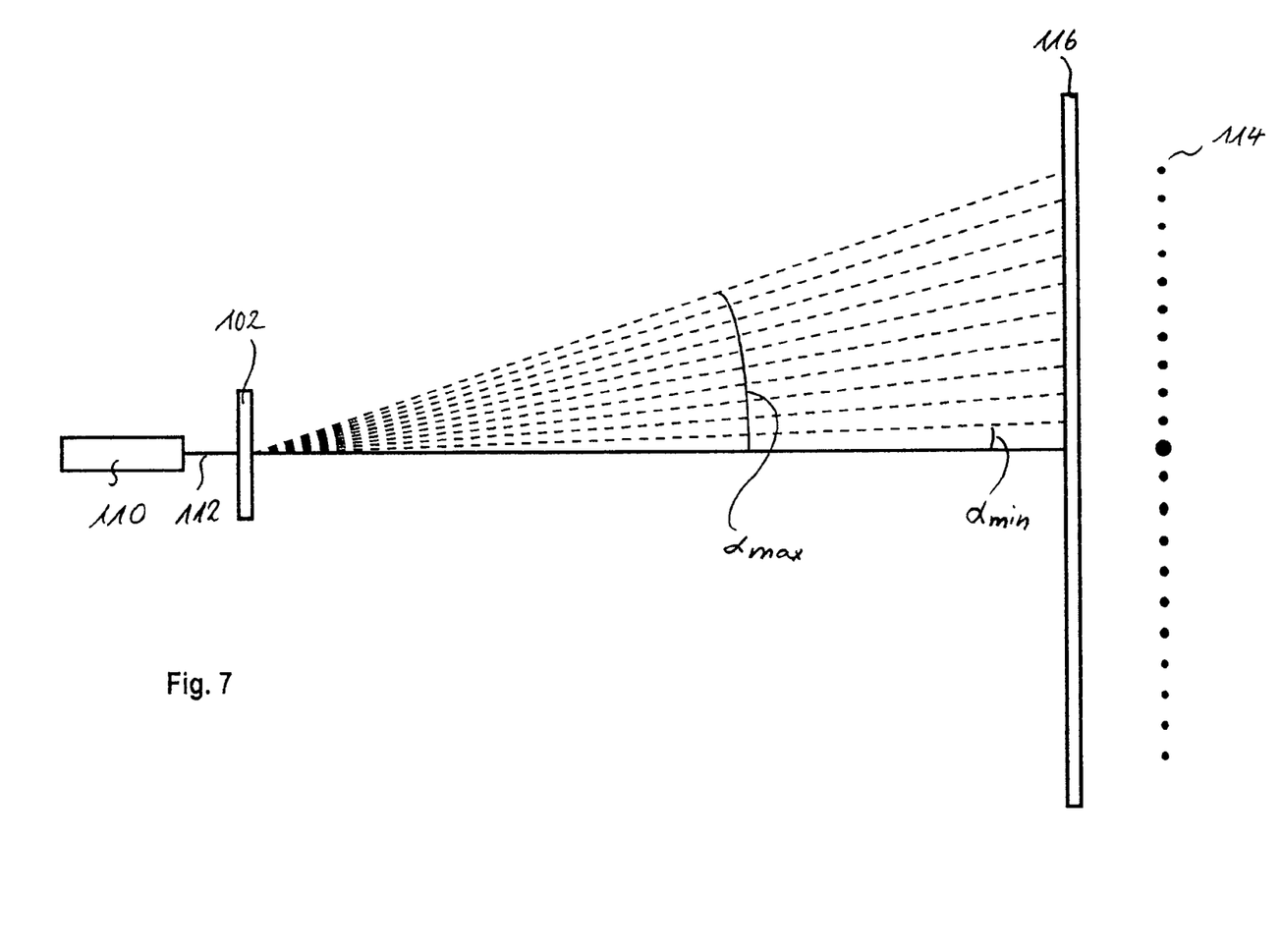
FIG. 7 shows an example of a radiation pattern generated by the optical processing element according to the present invention.

FIG. 7 schematically illustrates the functioning of the optical processing element 102 according to one particular example. It has to be mentioned that the present drawing is not to scale, in order to enhance the clarity for the following explanations.

An alignment radiation source 110, for instance a laser module with a collimator, generates a laser beam 112. The laser beam 112 passes through the optical processing element 102. In the present example, this is a Diffractive Optical Element (DOE), which splits the laser beam 112 into a plurality of beams forming a straight line of dots 114 on a target surface 116. As already mentioned, also other radiation patterns 114 than the one schematically shown in FIG. 7 can be achieved. In the present example the laser beam 112 is split into a radiation pattern 114 having a centre spot with larger intensity and a plurality of smaller light points with lower intensity. The distance between the optical processing element 102 and the target surface 116 for the present example may, for instance, be up to 18 m. The maximum angle indicated in FIG. 7, $\alpha_{max}$, is around 4.25°, whereas the minimum angle between the central beam and the next following weaker beam, $\alpha_{min}$, amounts to about 0.45°. For a correct alignment of one stick of a light curtain, where the laser module and DOE is mounted, with respect to a second stick representing the target surface, about ten light spots are needed, so that the upper half of the beams above the central beam can be used and the lower half of FIG. 7 would not be necessary.

Figure 8:
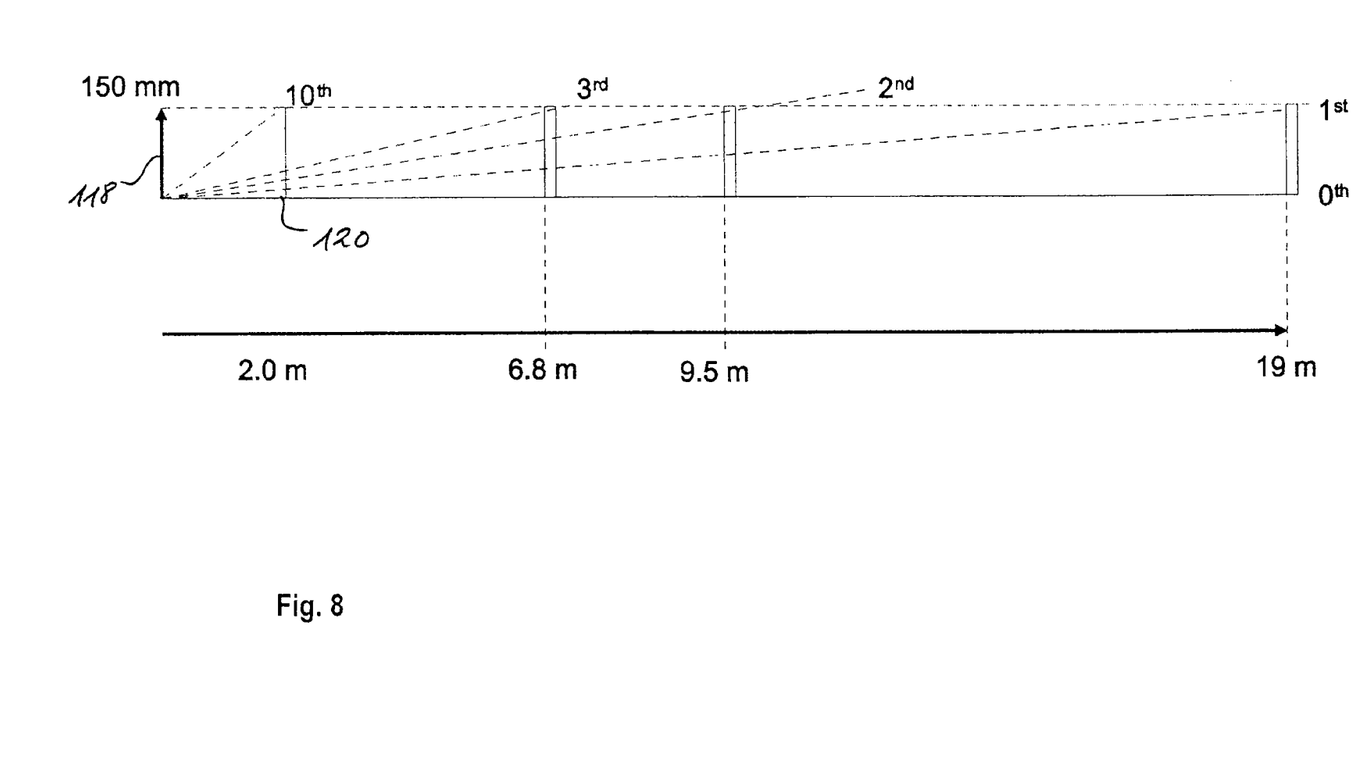
FIG. 8 shows an alignment of two short support elements with respect to each other.

According to the present invention, the optical unit 100 as shown in FIGS. 2 to 6 forms part of an alignment system that is used for aligning two sticks of a light curtain with respect to each other. FIG. 8 shows the alignment of a first light curtain stick 118 and a second light curtain stick 120. In the example shown in FIG. 8, only the first light curtain stick 118 has a laser radiation emitting device and optical unit according to the present invention, whereas the second light curtain stick has the function of a target surface. However, for a person skilled in the art it is clear that of course also both light curtains may be equipped with an alignment radiation source.

Furthermore, even if it might be advantageous to use the combined optical unit 100 having waveguides and an optical processing element in an integrated form, the general idea of aligning light curtain sticks with respect to each other by employing an optical processing element 102 can of course also be realized by only using a radiation source and the optical processing element, as explained with respect to FIG. 7.

In FIG. 8 the alignment of two rather short light curtain sticks, for instance having a length of about 150 mm, is explained. It is assumed that the first light curtain stick has an alignment radiation source and optical processing elements, which generate a radiation pattern 114, as shown in FIG. 7.

As can be seen from FIG. 8, in a distance of 2 m between both sticks and below, all ten light spots can be evaluated on the second light curtain stick 120. A distance of 6.8 m and 9.5 m are the limit for still being able to use the third and second beam, respectively. The fact that at least two light points, i.e. the central beam and the first side beam are needed for an alignment, leads to the limit of a distance of 19 m using the particular radiation pattern of FIG. 7 with a minimal angle a min of 0.45° and a maximum angle of a max is 4.25°.

Figure 9:
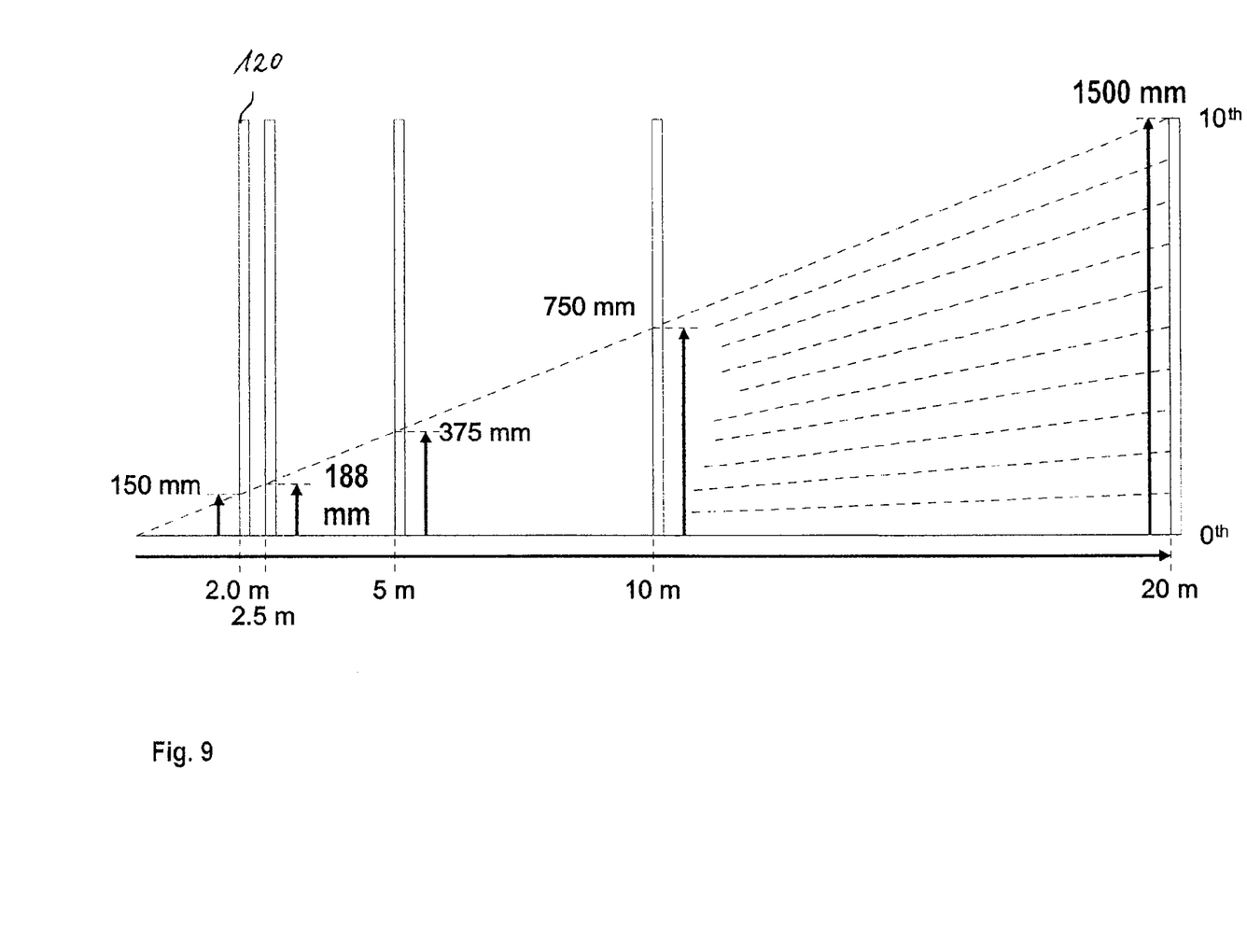
FIG. 9 shows the alignment of two longer support elements.
Figure 10:
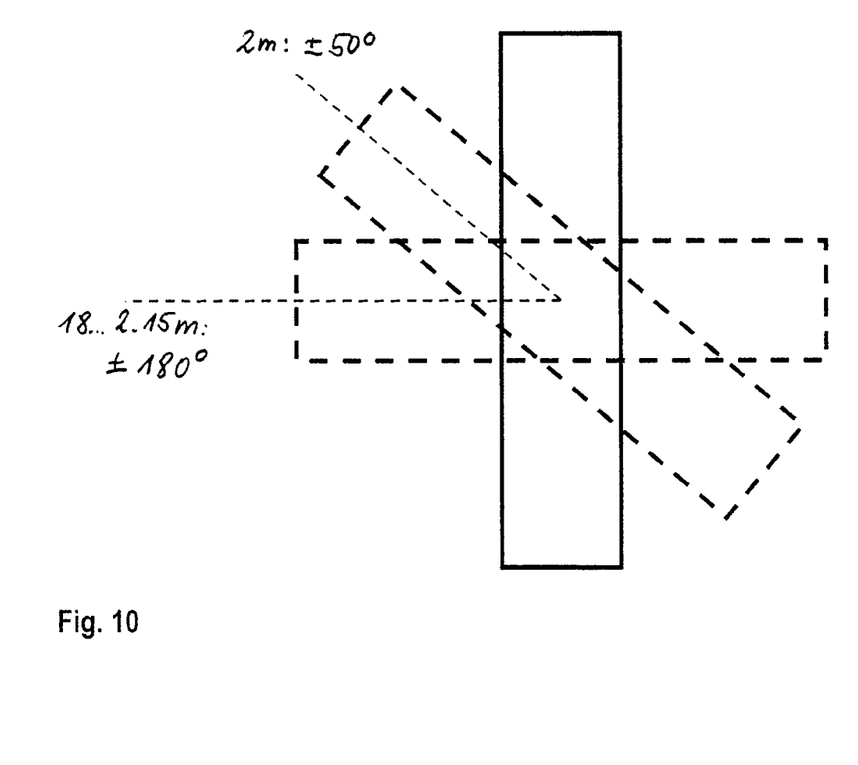
FIG. 10 illustrates the allowable rotation for the short light curtain support element.

On the other hand, as shown in FIG. 9, with a radiation pattern 114 as shown in FIG. 7, all ten light spots are visible on a light curtain stick of 1.50 m in a distance from the light source of 20 m. Short light curtain systems, as the one depicted in FIG. 10, allow for an operation distance between 10 m and 18 m and a maximum rotation of ±50° at a distance between 2.00 m and 2.15 m without interruption of the light curtain. In a distance range between 2.15 m and 20 m, a complete rotation of the position between the two sticks is possible without interrupting the light curtain.

Figure 11:
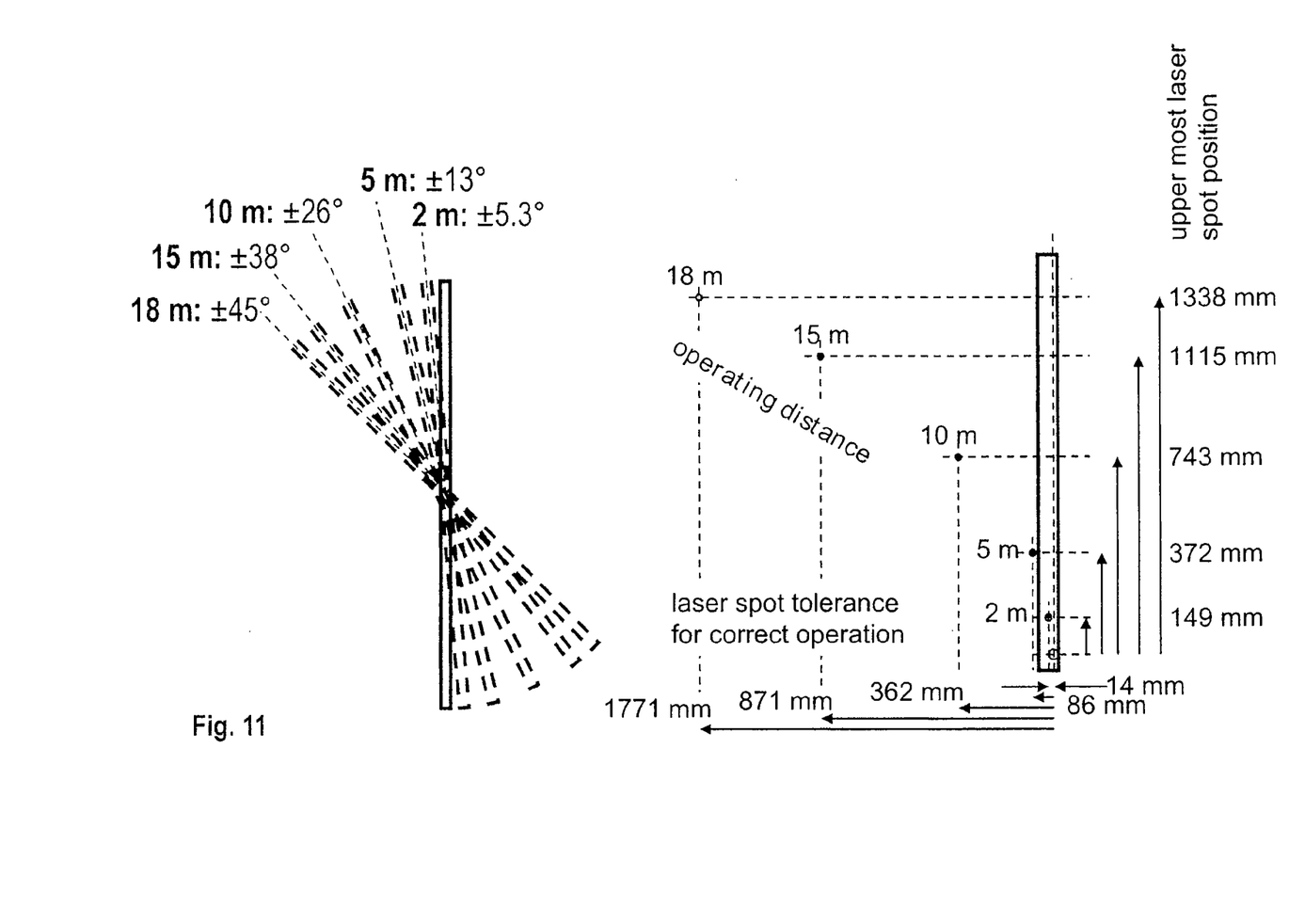
FIG. 11 shows the allowable rotation for longer light curtains.

The allowed rotation for long light curtain sticks is schematically depicted in FIG. 11. Depending on the operating distance between the first and second light curtain stick, and assuming an effective aperture angle of about 2°, the laser spot tolerances for correct operation are given on the right-hand side of FIG. 11, whereas the maximum possible rotation angle is summarized on the left-hand part of FIG. 11. The maximum possible rotation occurs at 18 m and amounts to ±45°.

In summary, the alignment system using a radiation pattern, as shown in FIG. 7, at a two metres distance and a length of the light curtain sticks of 1500 mm allows a rotation of 5° of the stick. With a 14 mm deviation of the topmost laser point or a 131 mm deviation of the topmost end of the stick, the line of light points can still easily be seen. Generally, it could be shown that longer sticks at short distances are easier to align (refer to FIG. 9).

Figure 12:
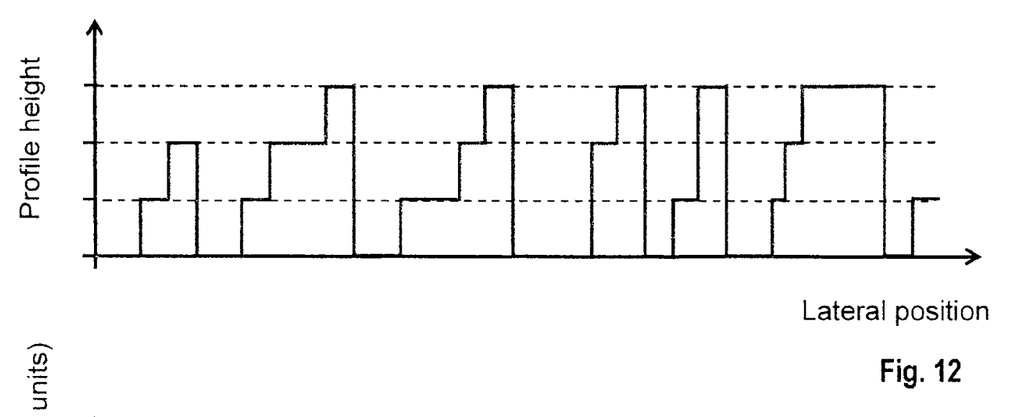
FIG. 12 illustrates a part of a phase grating of a DOE.

From a more abstract point of view, the optical processing unit 102 should be designed in a way to generate a desired light pattern from a given radiation beam. In the above-explained example, this should be for instance a row of ten laser radiation points having a distance of about 0.4°. As already mentioned, there exist several possibilities of transforming the light from one radiation source into such a pattern. The first possibility is the use of a computer-generated Diffractive Optical Element (DOE). FIG. 12 depicts an example of a phase grating of such a DOE. Such a DOE has the advantage that the desired radiation pattern can be generated with the highest flexibility and accuracy. However, the fabrication expenditure is rather high and—as a binary DOE is not sufficient to generate this radiation pattern—a four-step DOE, as shown in FIG. 12, has to be designed.

Figure 13:
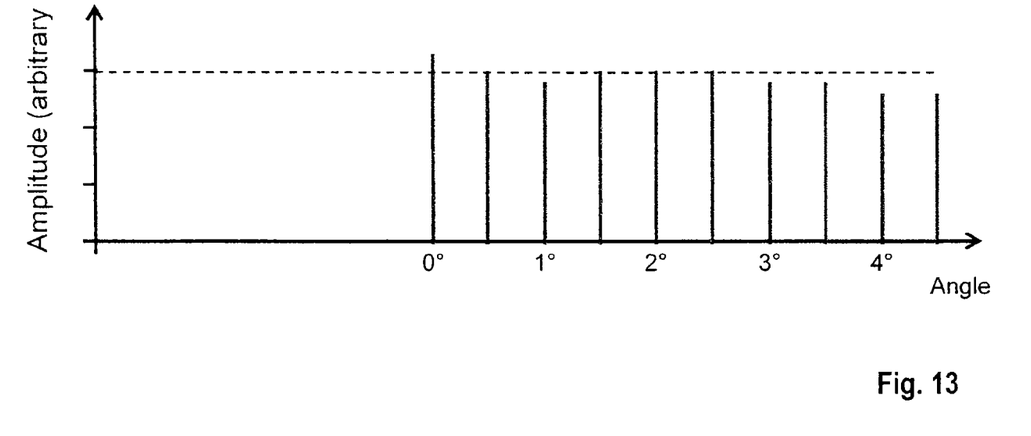
FIG. 13 shows the distribution of light in the far field for the grating of FIG. 12.

FIG. 13 shows the light distribution, which is generated in the far field. In particular, the squared amplitude is shown as a function of the position.

Figure 14:
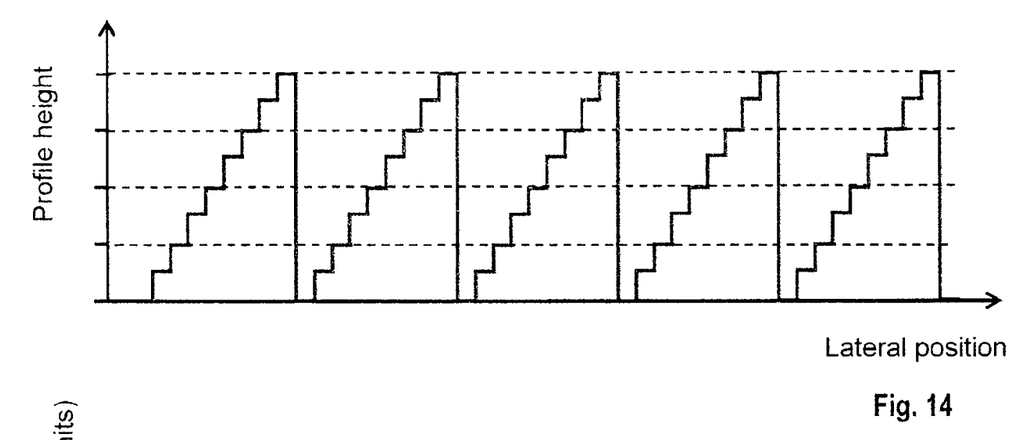
FIG. 14 shows a periodic grating.
Figure 15:
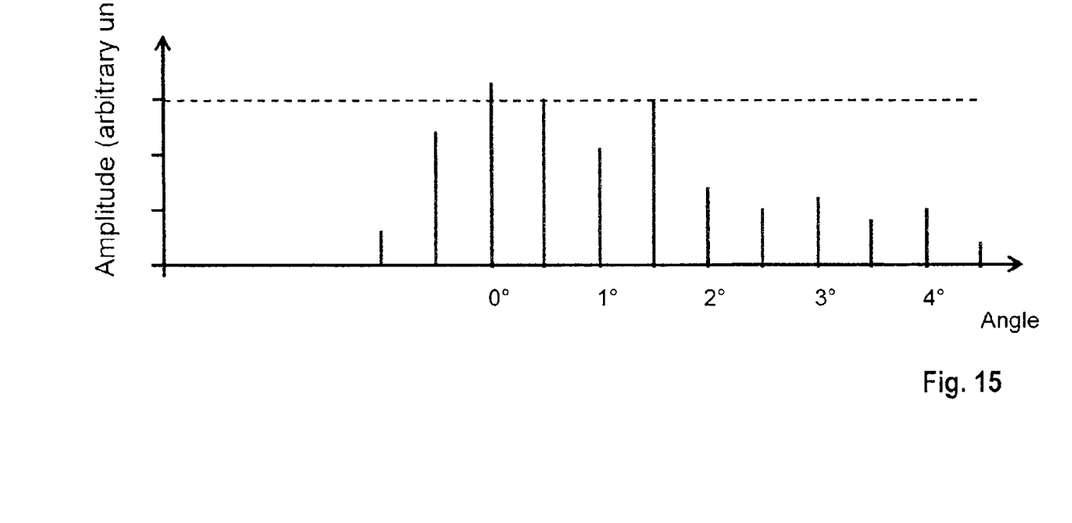
FIG. 15 shows the energy distribution in the far field generated by the grating of FIG. 14.

Alternatively, an optical grating of a periodic form can be used as shown in FIG. 14. This structure is also based on the principle of light diffraction, but is much easier to fabricate. However, a periodic diffraction grating as shown in FIG. 14 has the disadvantage that the degree of the energy distribution can be influenced to a much smaller extent. FIG. 15 shows the energy distribution in the far field, which can be generated by using the periodic grating of FIG. 14 for an optical processing element 102 according to the present invention.

Figures 16, 17:
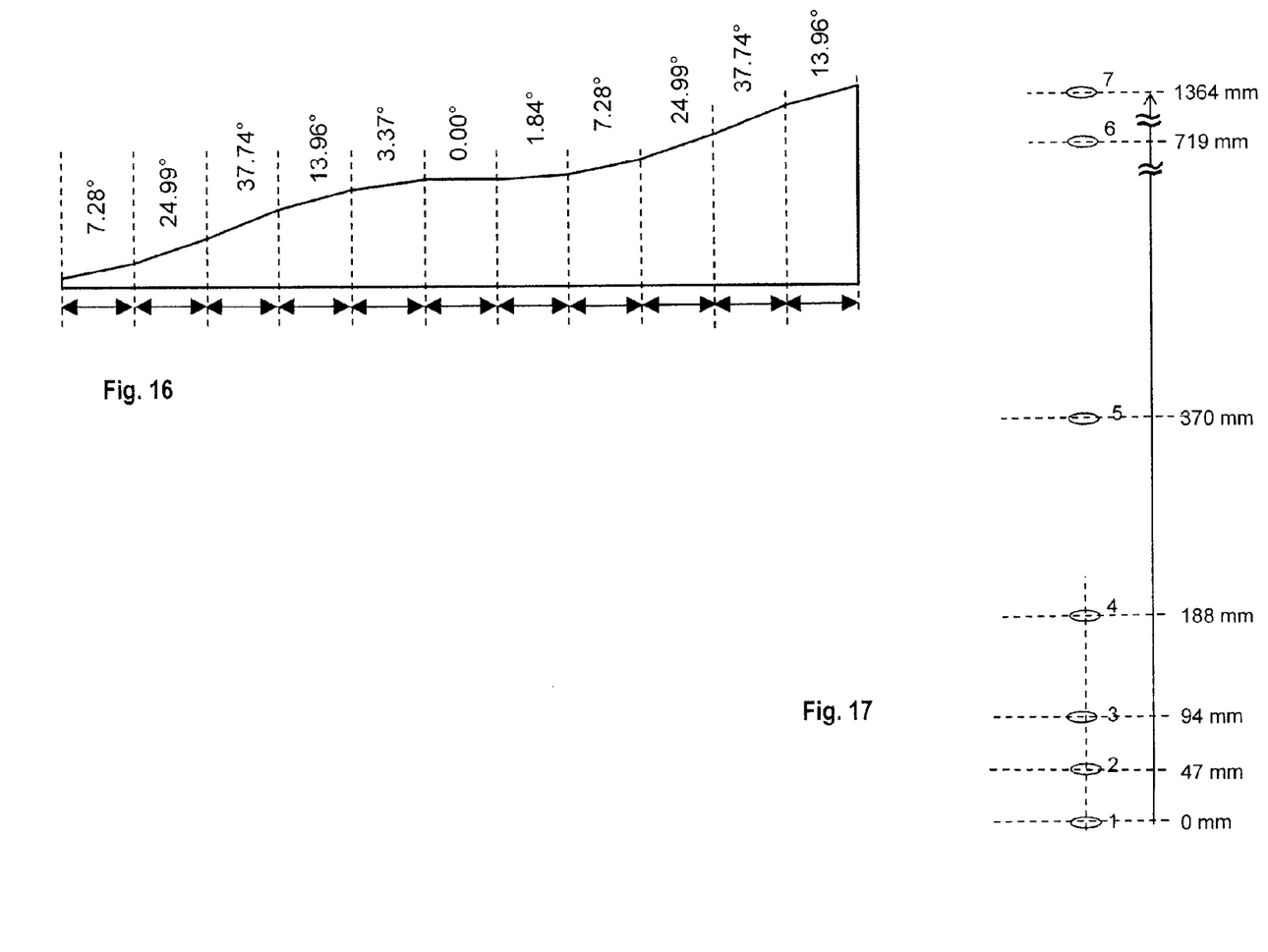
FIG. 16 shows a prismatic structure.
FIG. 17 shows the light distribution generated by the prismatic structure of FIG. 16.

Finally, not only diffraction, but also refraction can be used for generating a radiation pattern suitable for an alignment of two light curtain sticks with respect to each other. FIG. 16 shows such a prismatic structure and FIG. 17 depict the belonging light distribution in a distance of 3 m. A linear structure of prisms with steadily changing angles, as shown in FIG. 16, also has the advantage of the comparatively simple fabrication. A disadvantage of using a prismatic structure can be seen in the fact that the laser points are deformed by some extent and that when using a small laser cross section, mounting tolerances have therefore to be taken into account.

Figure 18:
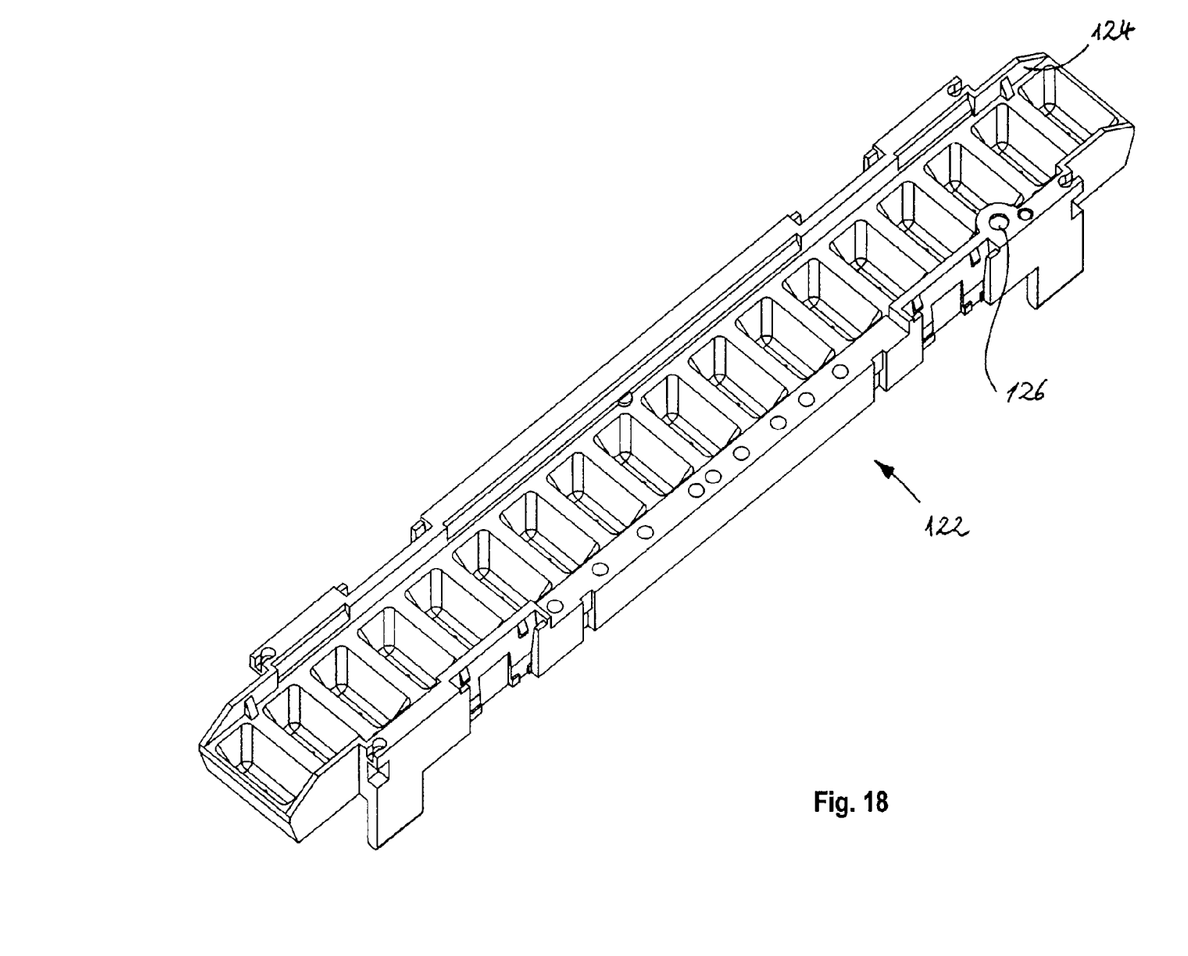
FIG. 18 shows the housing of a support element according to the present invention.
Figure 19:
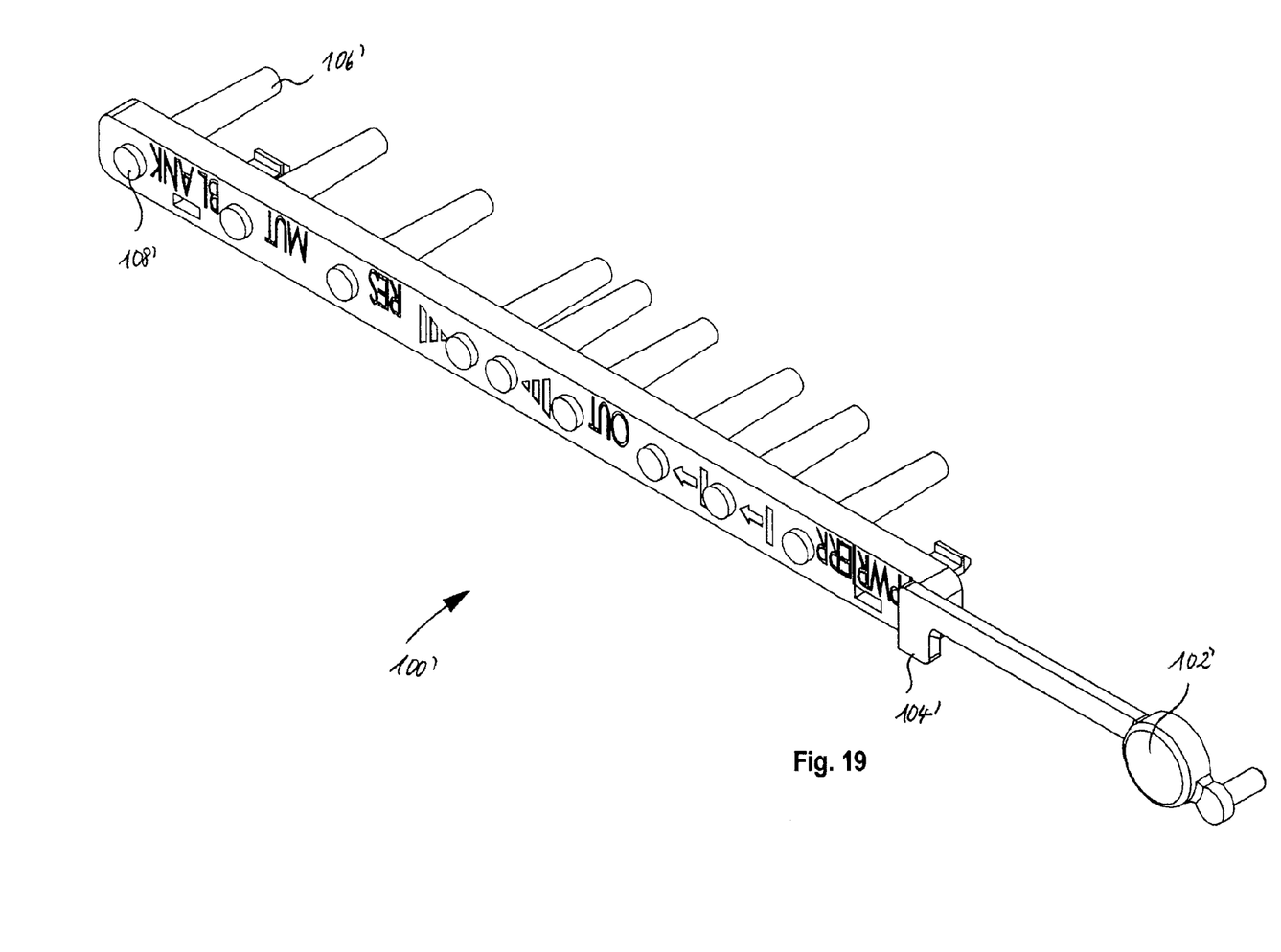
FIG. 19 shows a perspective view of an optical unit according to a second advantageous embodiment.
Figure 20:
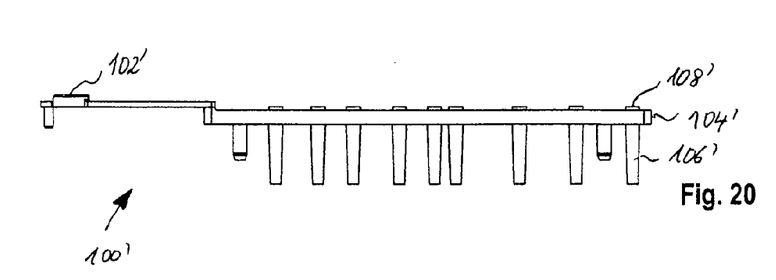
FIG. 20 shows a side view of the optical unit of FIG. 19.
Figure 21:
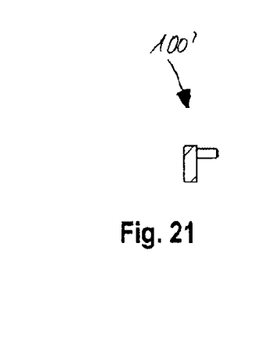
FIG. 21 shows a sectional view of the optical unit according to FIG. 19
Figure 22:
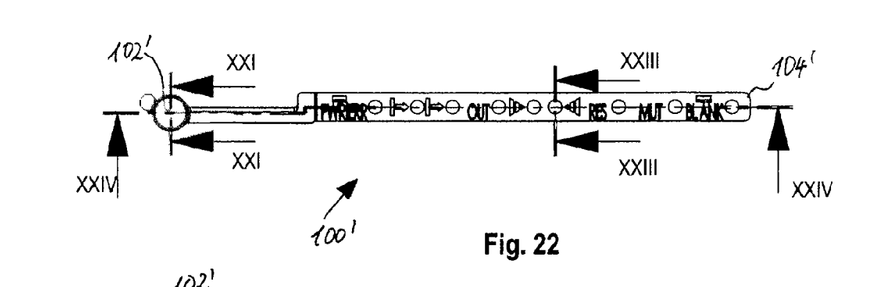
FIG. 22 shows a top view of the optical unit according to FIG. 19.
Figure 23:
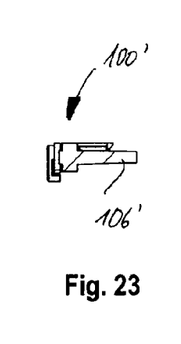
FIG. 23 shows another sectional view of the optical unit according to FIG. 19.
Figure 24:
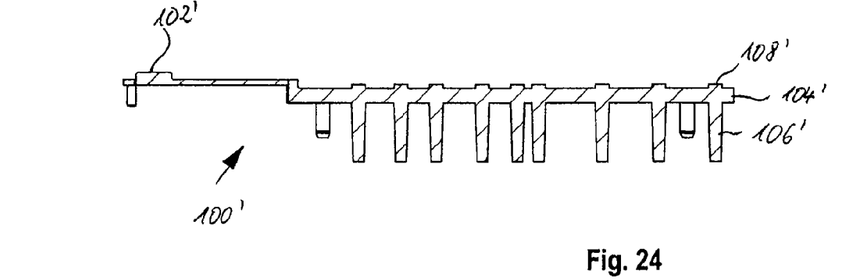
FIG. 24 shows another sectional view of the optical unit of FIG. 19.

FIG. 18 shows an example of a light curtain support element 122, which on the one hand is formed to accommodate the optical elements for forming the light curtain and, on the other hand, has a recess 124 for mounting the optical unit 100' (as shown in the following FIGS. 19 to 24) according to the present invention.

When using the present invention in the frame of a modular transceiver bar according to European patent application EP 11162263.5, both support elements of the first and the second light curtain stick can be formed identically, each having the recess 124. The functionality of the respective light curtain stick is then defined by a plug-in module (not shown in the figure). In this case, the alignment radiation source which is housed in the opening 126, can either be left inactive for one of the light curtain sticks or it can be used in both directions.

An alternative embodiment of an optical unit 100' is shown in FIGS. 19 to 24. The main difference to the first example is the omission of the lenses and the reduction of the material in the area of the main body 104'. In contrast to the optical unit 100 shown in FIGS. 1 to 6, this embodiment has longer optical waveguides 106', and firstly allows a fabrication which adds the optical waveguides from a different material as the main body 104' and furthermore, needs less material that might be costly, if it is for instance fused silica or another micro-machined part.

In summary, the present invention firstly has the advantage that by using a Diffractive Optical Element (DOE) a laser beam is split into various spots of different intensity so that a central spot is easily visible, thus facilitating a horizontal alignment, whereas all others are arranged in one exact row, thus facilitating the vertical alignment. This alignment system allows for a much cheaper alignment of the two sticks of a safety light curtain, because the building of two identical sticks is possible and only one laser module for each stick is required. A direct comparison shows that even when using as the optical processing element a computer-generated DOE, same is cheaper than providing an additional laser module.

Furthermore, when combining the optical processing element with one or more additional optical functional elements, such as lenses or optical waveguides to form optical units according to the present invention, an accurate positioning of the element within the module is possible, thus providing the spots in the required tolerance. The optical unit is a longer element than only a DOE chip, but is less costly than providing a larger DOE.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An alignment system for a light curtain monitoring a protective field, the light curtain comprising:
    a first support element and a second support element, wherein the protective field is covered by radiation transmitted between the first and second support elements, wherein the alignment system comprises at least one alignment radiation source being arranged on the first support element and at least one alignment radiation receiver arranged on the second support element for receiving the alignment radiation and for providing an alignment signal indicating a correct positioning of the two support elements with respect to each other, the alignment system further comprising at least one optical unit having an optical processing element configured to generate a defined pattern from the alignment radiation emitted by the at least one alignment radiation source, wherein the optical processing element comprises at least one of a micro-structured Diffractive Optical Element, an optical grating structure, and a prismatic structure.

2. The alignment system of claim 1, wherein a plurality of waveguide elements are formed at the optical unit, each waveguide being formed to image light from a status indicating LED onto a display region which is visible to an observer.

3. The alignment system of claim 1, wherein a plurality of lenses are formed at the optical unit, each lens being formed to focus the radiation transmitted to cover the protective field between the support elements.

4. The alignment system of claim 1, wherein the alignment radiation receiver comprises a target surface for reflecting the radiation pattern, the reflection forming the alignment signal.

5. The alignment system of claim 1, wherein the optical unit is fabricated as an integral molded part from a plastic material or as a micromachined part from glass, quartz, or plastic.

6. The alignment system of claim 1, wherein the optical processing element is structured to form, in a planar observation region, a plurality of light points arranged in an essentially straight line from the radiation of a laser radiation source.

7. The alignment system of claim 1, wherein the optical processing element is structured to form, in a planar observation region, a plurality of light points having differing intensities, wherein a central point has a higher intensity compared to remaining points.

8. The alignment system of claim 1, wherein the optical processing element further comprises at least one of an optical wave guide for guiding radiation from at least one display radiation source to a surface of the optical processing unit which is visible to an observer, and a lens for focusing radiation forming the light curtain.

9. A light curtain for monitoring a protective field, the light curtain comprising:
    a first support element and a second support element, wherein a protective field is covered by radiation transmitted between the first and second support elements; and
    an alignment system comprising at least one alignment radiation source being arranged on the first support element and at least one alignment radiation receiver arranged on the second support element for receiving the alignment radiation and for providing an alignment signal indicating a correct positioning of the two support elements with respect to each other, the alignment system further comprising at least one optical unit having an optical processing element configured to generate a defined pattern from the alignment radiation emitted by the at least one alignment radiation source, wherein the optical processing element comprises at least one of a micro-structured Diffractive Optical Element, an optical grating structure, and a prismatic structure.

* * * * *